United States Patent
Yu et al.

(10) Patent No.: US 7,639,447 B1
(45) Date of Patent: Dec. 29, 2009

(54) SERVO TRACK SQUEEZE COMPENSATION IN A DISK DRIVE

(75) Inventors: Jie Yu, Irvine, CA (US); Guoxiao Guo, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/032,911

(22) Filed: Feb. 18, 2008

(51) Int. Cl.
*G11B 5/596* (2006.01)
(52) U.S. Cl. .................................................. 360/77.04
(58) Field of Classification Search ........................ None
See application file for complete search history.

(56) References Cited

U.S. PATENT DOCUMENTS

| | | | |
|---|---|---|---|
| 5,612,833 A | 3/1997 | Yarmchuk et al. | |
| 5,793,559 A * | 8/1998 | Shepherd et al. | 360/77.04 |
| 5,844,742 A | 12/1998 | Yarmchuk et al. | |
| 5,889,631 A | 3/1999 | Hobson | |
| 5,907,447 A | 5/1999 | Yarmchuk et al. | |
| 5,930,068 A | 7/1999 | Gregg et al. | |
| 6,061,200 A * | 5/2000 | Shepherd et al. | 360/77.04 |
| 6,141,175 A | 10/2000 | Nazarian et al. | |
| 6,392,834 B1 | 5/2002 | Ellis | |
| 6,421,198 B1 | 7/2002 | Lamberts et al. | |
| 6,522,493 B1 * | 2/2003 | Dobbek et al. | 360/75 |
| 6,563,663 B1 | 5/2003 | Bi et al. | |
| 6,608,731 B2 | 8/2003 | Szita | |
| 6,611,397 B1 | 8/2003 | Nguyen | |
| 6,624,963 B2 | 9/2003 | Szita | |
| 6,654,198 B2 | 11/2003 | Liu et al. | |
| 6,657,810 B1 | 12/2003 | Kupferman | |
| 6,667,840 B1 | 12/2003 | Cheong et al. | |
| 6,735,040 B2 | 5/2004 | Galloway et al. | |
| 6,775,091 B1 | 8/2004 | Sutardja | |
| 6,785,084 B2 | 8/2004 | Szita | |
| 6,798,606 B2 * | 9/2004 | Tang et al. | 360/77.08 |
| 6,862,155 B2 | 3/2005 | Yang et al. | |
| 6,922,304 B2 * | 7/2005 | Nakagawa | 360/77.04 |
| 6,965,491 B1 | 11/2005 | Perlmutter et al. | |
| 6,972,922 B1 | 12/2005 | Subrahmanyam et al. | |
| 6,975,478 B2 * | 12/2005 | Fukushima et al. | 360/77.04 |
| 6,977,792 B1 * | 12/2005 | Melrose et al. | 360/77.04 |
| 6,995,941 B1 | 2/2006 | Miyamura et al. | |
| 6,999,266 B1 | 2/2006 | Schmidt | |

(Continued)

OTHER PUBLICATIONS

U.S. Appl. No. 11/770,554, filed Jun. 28, 2007.

*Primary Examiner*—Hoa T Nguyen
*Assistant Examiner*—James L Habermehl
(74) *Attorney, Agent, or Firm*—Blakely, Sokoloff, Taylor & Zafman

(57) ABSTRACT

A disk drive that compensates for written-in track squeeze errors (TSEs) during track following is disclosed. The disk drive may be used to compensate for TSEs when determining the position error signal (PES) by implementing operations that include: determining a track squeeze value for a servo sector based upon read servo bursts; determining a PES value for the servo sector based upon read servo bursts; estimating a Squeeze Correction Coefficient (SCC) to account for track squeeze induced PES sensing gain variation associated with the servo sector based upon the PES value and the track squeeze value; calculating a squeeze corrected PES value based upon the SCC and the PES value; and utilizing the squeeze corrected PES value in servo control.

16 Claims, 7 Drawing Sheets

U.S. PATENT DOCUMENTS

| | | |
|---|---|---|
| 7,002,767 B2 | 2/2006 | Annampedu et al. |
| 7,054,096 B1 | 5/2006 | Sun et al. |
| 7,106,542 B1 | 9/2006 | Sun et al. |
| 7,106,547 B1 | 9/2006 | Hargarten et al. |
| 7,110,209 B2 | 9/2006 | Ehrlich et al. |
| 7,119,981 B2 | 10/2006 | Hanson et al. |
| 7,123,433 B1 | 10/2006 | Melrose et al. |
| 7,167,336 B1 | 1/2007 | Ehrlich et al. |
| 7,271,977 B1 * | 9/2007 | Melrose et al. .......... 360/77.04 |
| 7,315,431 B1 * | 1/2008 | Perlmutter et al. ....... 360/77.04 |
| 7,408,735 B1 * | 8/2008 | Coric ...................... 360/77.04 |
| 7,525,754 B2 * | 4/2009 | Melrose et al. .......... 360/77.04 |
| 2001/0040755 A1 | 11/2001 | Szita |
| 2002/0067567 A1 | 6/2002 | Szita |
| 2005/0185319 A1 | 8/2005 | Liu et al. |
| 2007/0096678 A1 * | 5/2007 | Melrose .................... 318/652 |
| 2007/0297088 A1 * | 12/2007 | Sun et al. ................. 360/77.04 |
| 2008/0186617 A1 * | 8/2008 | Hosono et al. ........... 360/77.02 |
| 2008/0239555 A1 * | 10/2008 | Ehrlich et al. ............ 360/77.08 |
| 2009/0002874 A1 * | 1/2009 | Melrose et al. .......... 360/77.04 |
| 2009/0086364 A1 * | 4/2009 | Gerasimov ............... 360/77.04 |

* cited by examiner

SERVO TRACK SQUEEZE COMPENSATION IN A DISK DRIVE

BACKGROUND

A huge market exists for disk drives for mass-market computing devices such as desktop computers and laptop computers, as well as small form factor (SFF) disk drives for use in mobile computing devices (e.g., personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk. Each servo sector typically includes at least a track identification (TKID) field, a sector ID field having a sector ID number to identify the sector, and a group of servo bursts (e.g. an alternating pattern of magnetic transitions) which the servo control system of the disk drive samples to align the moveable transducer head with or relative to a particular track. Typically, the servo control system moves the transducer head toward a desired track during a "seek" mode using the TKID field as a control input.

Once the moveable transducer head is generally over the desired track, the servo control system uses the servo bursts to keep the moveable transducer head over that track in a "track follow" mode. During track follow mode, the moveable transducer head repeatedly reads the sector ID field of each successive servo sector to obtain the binary encoded sector ID number that identifies each sector of the track. In this way, the servo control system continuously knows where the moveable transducer head is relative to the disk. Further, position error signals (PESs) are often utilized as a feedback signal for the servo control system during track following operations. The PES signal may be derived from read servo bursts as the head flies over the servo bursts of the servo sectors of the disk. The PES signal may be utilized by the servo control system to keep the head near the center of the track.

Servo sectors may be written to a disk to define a plurality of evenly-spaced, concentric tracks. Servo writers may be used to write the servo sectors to the disk during disk drive manufacturing. Servo writers often employ extremely accurate head positioning mechanics, such as laser interferometers or optical encoders, to ensure that the servo sectors are written at the proper radial location and extremely accurate clocking systems may be utilized in order to write the servo sectors in the proper circumferential locations on the disk. Alternatively, many disk drives now have the capability to self servo-write servo sectors.

As disk drive manufacturers have been forced to increase data capacity in disk drives to remain competitive, a greater number of tracks are required to be servo-written to each disk to provide for increased data storage capacity. To accomplish this, the distance between each of the servo-written tracks has become increasingly smaller.

Unfortunately, due to the smaller distances now being utilized between tracks in the servo-writing of servo sectors, written-in track squeeze errors (TSEs) often result in which servo bursts deviate from their normal positions. TSEs may cause increased servo control errors during track following resulting in degraded performance, reliability issues, and even disk drive failure. It is therefore desirable to employ techniques to compensate for written-in TSEs during track following to minimize TSE-induced servo control errors.

DETAILED DESCRIPTION

Figure 1:
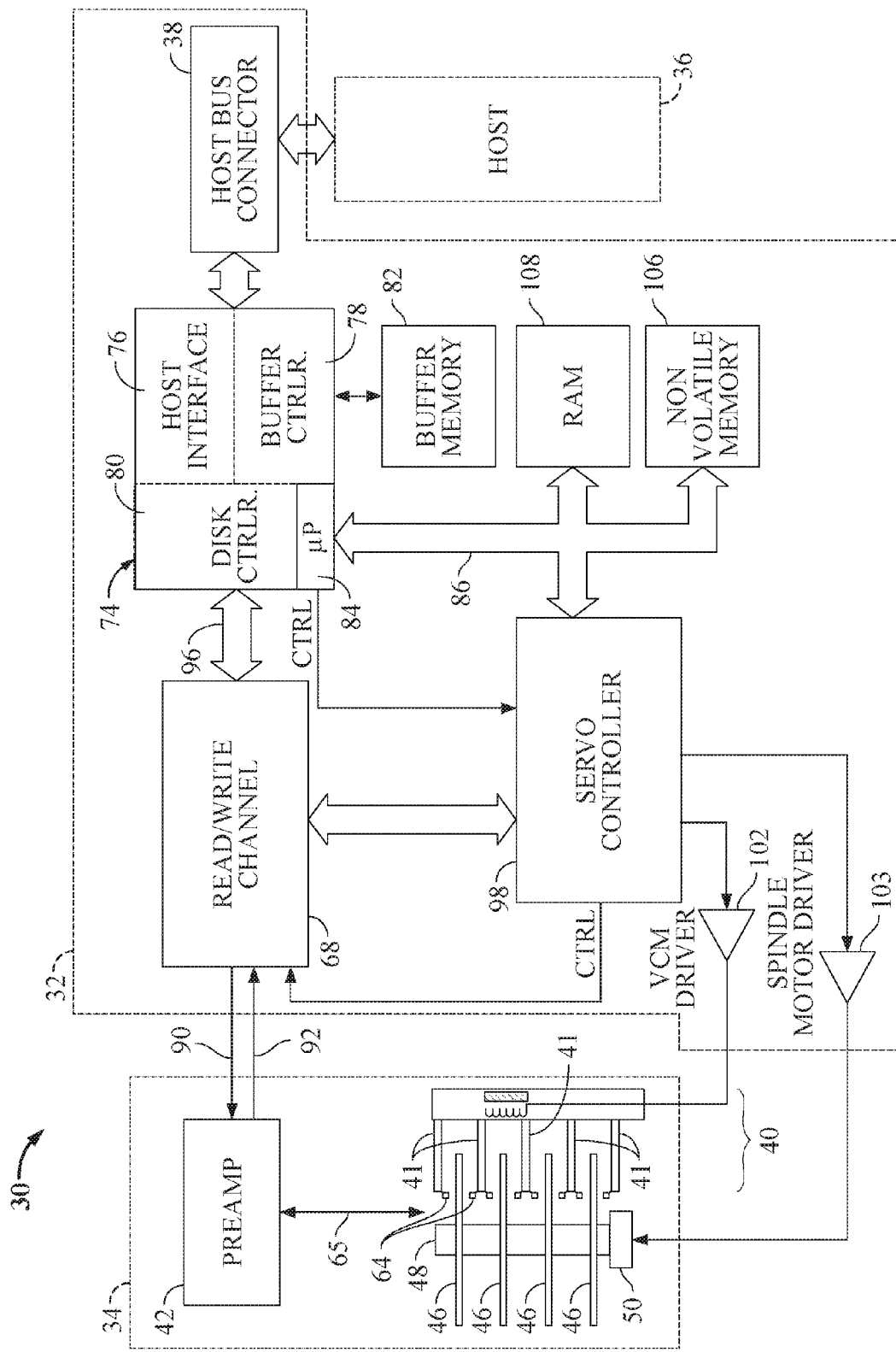
FIG. 1 is a simplified block diagram of a disk drive, according to one embodiment of the invention.

FIG. 1 shows a simplified block diagram of a disk drive 30, according to one embodiment of the invention. Disk drive 30 may comprise a Head/Disk Assembly (HDA) 34 and a controller printed circuit board assembly (PCBA) 32. Disk drive 30 may be of a suitable form factor and capacity for larger computers or for smaller mobile devices (e.g. a small form factor (SFF) disk drive). Host 36 may be a computing device such as a desktop computer, a laptop computer, server computer, a mobile computing device (e.g. PDA, camera, cell-phone, etc.), or any type of computing device.

HDA 34 may include: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

In one embodiment, microprocessor 84 may operate under the control of a program or routine to execute methods or processes to identify and compensate for written-in track squeeze errors (TSEs) during track following, as will be described in more detail.

Host initiated operations for reading and writing data in disk drive 30 may be executed under control of microprocessor 84 of HIDC 74 which is connected to the controllers and memory arrays via bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 may be encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Channel 68 may employ PRML (partial response maximum likelihood) coding techniques, although other coding processes may be utilized.

HIDC 74 includes disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

In one embodiment, disk drive 30 employs a sampled servo system in which equally spaced servo sectors (termed "servo sectors") are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98, to provide position information to microprocessor 84 via bus 86.

Figure 2:
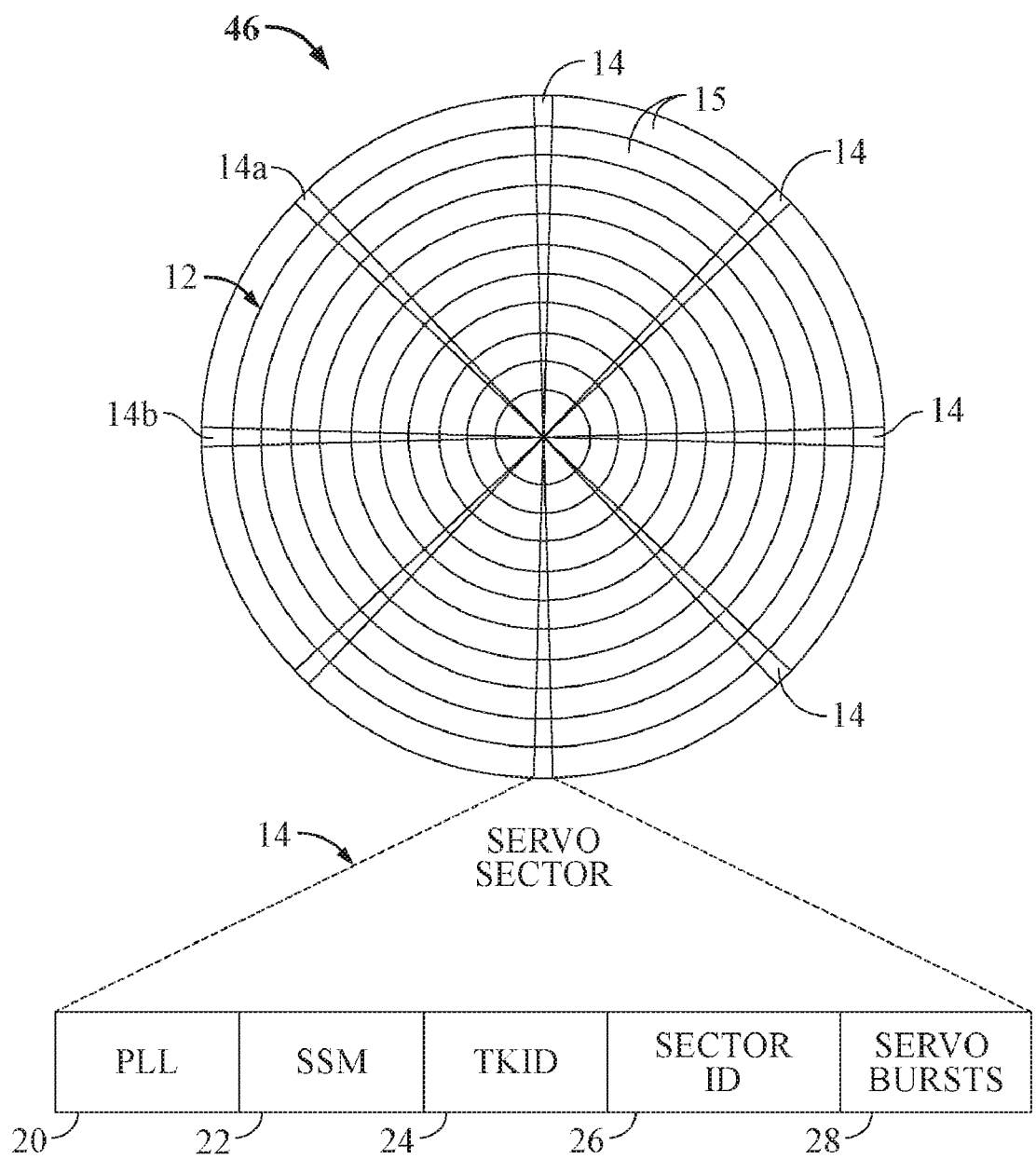
FIG. 2 is a diagram showing a disk of the disk drive of FIG. 1 having a plurality of concentric tracks, and more particularly, illustrates components of a servo sector.

FIG. 2 shows a disk 46 of the disk drive 30 of FIG. 1 having a plurality of concentric tracks, and more particularly, illustrates components of a servo sector 14. Disk 46 includes a plurality of concentric circumferential tracks 12. Each circumferential track 12 includes a plurality of embedded servo sectors 14 utilized in seeking and track following. The plurality of servo sectors 14 are spaced sequentially around a circumference of the circumferential track 12. For example, embedded servo sectors 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo sector 14.

Each servo sector 14 may include a phase lock loop (PLL) field 20, a servo synch mark (SSM) field 22, a track identification (TKID) field 24, a sector identifier (ID) 26, and a group of servo bursts 28, such as an alternating pattern of magnetic transitions, that the servo control system samples to align the moveable transducer head with, and relative to, a particular track. Typically, servo controller 98 moves the transducer head 64 toward a desired track during a "seek" mode using the TKID field 24 as a control input.

In processing information, to ensure consistency in the detection of bits composing a block of bits, the phase lock loop (PLL) field 20 is first read in order to facilitate bit synchronization. Next, the servo synch mark 22 is read to facilitate block synchronization. The SSM 22 facilitates block synchronization by acting as a special marker that is detected to "frame" data, i.e., to identify a boundary of a block. A valid servo synchronization signal results in the read/write channel 68 of the disk drive 30 establishing a precise timing reference point for the reading of servo data and for read/write operations. It is well known to provide framing of servo data via a SSM. The sector ID 26 is a binary encoded sector ID number to identify the sector.

Further, once the transducer head 64 is generally over a desired track 12, the servo controller 98 uses servo bursts 28 to keep the transducer head 64 over the track in a "track follow" mode based upon demodulated PES values from the read servo bursts. During track following mode, the moveable transducer head 64 repeatedly reads the sector ID 26 of each successive servo sector to obtain the binary encoded sector ID number that identifies each sector of the track.

Based on the TKID and sector ID, the servo controller 98 continuously knows where the head 64 is relative to the disk 46 and communicates this to microprocessor 84. In this way, the microprocessor 84 continuously knows where the head 64 is relative to the disk and can command the movement of the head 64, via the servo controller 98, to implement disk drive operations, such as seeking, tracking, read/write operations, etc.

Figure 3:
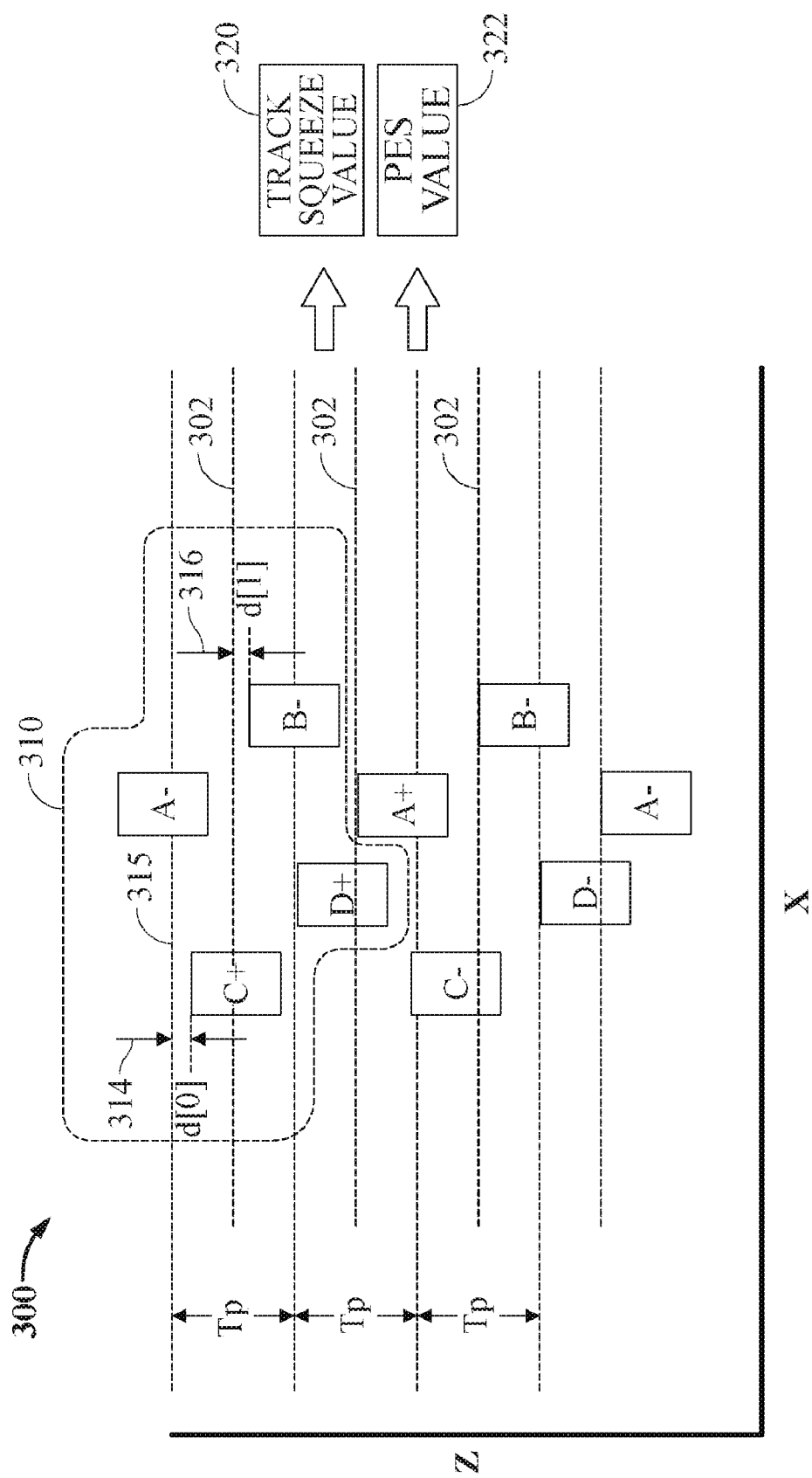
FIG. 3 is a diagram that illustrates an example of servo bursts A, B, C, and D that have been previously servo-written to a track of a disk and associated track squeeze errors (TSEs).

FIG. 3 is a diagram 300 that illustrates an example of servo bursts A, B, C, and D that have been previously servo-written to a track. The z-axis is in the radial direction of the disk and the x-axis is along the longitudinal direction of the disk. Three tracks (each with track pitch Tp) are shown each having a respective track center 302.

In particular, FIG. 3 illustrates that when servo bursts A, B, C, and D are written to a track during the servo-writing process they typically include a plurality of servo written-in errors (SWEs). There are two servo writing steps (one burst written at each step) for one track shown. As can be seen in FIG. 3, with respect to group 310, two examples of SWEs are shown: d[0] 314 with respect to servo burst C+ (where "+" represents in phase with preamble while "−" represents out of phase with preamble) and track boundary 315; and d[1] 316 with respect to B− and track center 302. These SWEs d[0] 314 and d[1] 316 may be estimated and denoted as track-squeeze errors (TSEs).

Many methods for track squeeze error (TSE) estimation are known in the art and may be utilized. For example, one such methodology includes the use of linear estimation techniques for TSE estimation. In one particular embodiment, applicant's TSE estimation techniques disclosed in co-pending application Ser. No. 11/770,554, filed on Jun. 28, 2007, entitled "System and Method for Identifying Track Squeeze Errors (TSEs) of a Disk of Disk Drive" may be utilized.

Based upon the read servo bursts (e.g., A, B, C, D), a position error signal (PES) 322 may be generated as is well known in the art. Further, based upon the read servo bursts (e.g., A, B, C, D), utilizing a suitable TSE estimation methodology, a track squeeze value 320 representative of a TSE estimate may be generated.

In one embodiment of the invention, disk drive 30 compensates for TSEs 320 during track following. In particular, microprocessor 84 (hereinafter termed "processor") compensates for TSEs during track following by implementing operations that include: determining a track squeeze value 320 for a servo sector based upon the read servo bursts 310; determining a position error signal (PES) value 322 for the servo sector based upon the read servo bursts 310; estimating a Squeeze Correction Coefficient (SCC) to account for track squeeze associated with the servo sector based upon the PES value 322 and the track squeeze value 320; calculating a squeeze corrected PES value based upon the SCC and the PES value; and utilizing the squeeze corrected PES value in servo control.

It should be appreciated that embodiments of the invention may be implemented with processor 84, servo controller 98, and/or other circuitry of disk drive 30. Particularly, circuitry of disk drive 30, including but not limited to processor 84, may operate under the control of a program or routine to execute methods or processes in accordance with one embodiment of the invention related to identifying and compensating for TSEs during track following. For example, such a program may be implemented in firmware or software (e.g., stored in non-volatile memory 106 or other locations) and may be implemented in a processor such as processor 84, servo controller 98, and/or other circuitry of disk drive 30.

For the purposes of the present specification, it should be appreciated that the terms "processor", "microprocessor", and "controller", etc., refer to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, etc. Further, it should be appreciated that the term processor, microprocessor, circuitry, controller, etc., refer to any type of logic or circuitry capable of executing logic, commands, instructions, software, firmware, functionality, etc.

Figure 4:
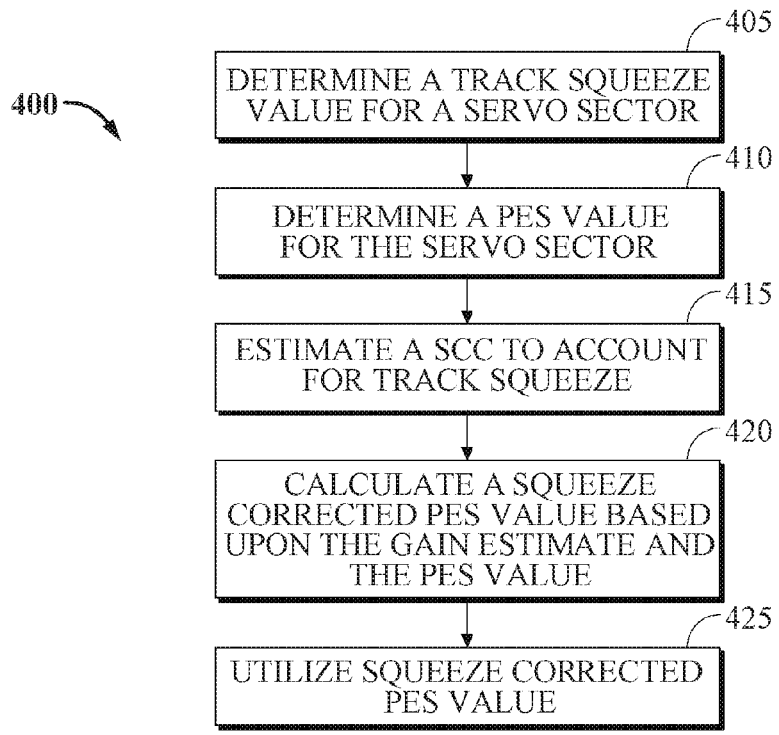
FIG. 4 is a flow diagram illustrating a process that may be utilized to compensate for servo track squeeze errors (TSEs) during track following, according to one embodiment of the invention.

FIG. 4 is a flow diagram illustrating a process 400 that may be utilized to compensate for servo track squeeze errors (TSEs) during track following, according to one embodiment of the invention. In one embodiment, process 400 may be implemented by processor 84 of disk drive 30 in conjunction with servo controller 98 to implement servo control operations.

At block 405, a track squeeze value may be determined for a servo sector based upon the reading of servo bursts. The track squeeze value corresponds to a value that is correlated to an estimate of the track squeeze error (TSE) associated with the servo bursts of a servo sector. As previously described, many methods are known for the estimation of track squeeze error (TSE). In one embodiment, the track squeeze value may be determined based upon a track squeeze model having calibrated parameters for a servo sector. Such a track squeeze model having calibrated parameters is disclosed in applicant's co-pending application (Ser. No. 11/770,554), as previously discussed.

At block 410, a PES value is determined for the servo sector based upon the read servo bursts. Next, a Squeeze Correction Coefficient (SCC) to account for the TSE associated with the servo sector is estimated (block 415). The SCC may be based upon the PES value and/or the servo burst values. In one particular embodiment, the SCC is based upon a track squeeze value that is derived from the servo bursts.

A squeeze corrected PES value is then calculated based upon the SCC and the PES value (block 420). In one embodiment, the squeeze corrected PES value may be calculated by an equation of the form: Squeeze Corrected PES Value=SCC (z)*PES value(z); wherein z=position. In this embodiment, the SCC is proportionally less than 1 when the track is narrower than a nominal value and larger than 1 when the track is wider than a nominal value. In another embodiment, SCC $(z)=(|N|+|Q|)/(|N|_{nominal}+|Q|_{nominal})$ where N and Q are direct burst measurements for a 2-burst null-phase burst pattern. In another embodiment, N=|A−|B| and Q=|C−D| may be used in a split 4-burst pattern. The nominal N and Q values may represent the burst values with little or no squeeze. In one embodiment, $|N|_{nominal}$ and $|Q|_{nominal}$ can be measured average values of the tracks in a zone and stored in the form of a look up table or polynomial. The $|N|_{nominal}$ and $|Q|_{nominal}$ values may be functions of cylinder numbers and off track locations. A combination of multiple burst values across multiple offset locations of z may also be used to increase estimation accuracy. As one of ordinary skill in the art will recognize, the compensation scheme described herein may use any squeeze estimate.

The squeeze corrected PES value may be utilized by servo controller 98 for servo control during track following (block 425). In particular, servo controller 98 may position head 64 via VCM driver 102 to more accurately track follow based on the squeeze corrected PES value. The SCC may be calculated on-the-fly by processor 84 or may be calculated once and stored for a particular servo sector in the servo sector and may then be read back during servo control operations.

Thus, according to one embodiment of the invention, a technique for servo track squeeze error (TSE) compensation is provided that is introduced into the servo control loop itself. As each servo sector is read, a SCC is estimated that is based upon the PES value and the track squeeze value, which is an estimate of the TSE for that particular servo sector. The PES value may then be modified based upon the SCC before being sent to the servo control loop. As a result, PES sensing gain variation caused by track squeeze may be significantly reduced and servo loop robustness and stability may be maintained. This also improves other servo control compensation schemes such as techniques to characterize and remove written-in repeatable run-out (WRRO). It should be appreciated that many different types of WRRO compensation schemes are known in the art.

Figure 5:
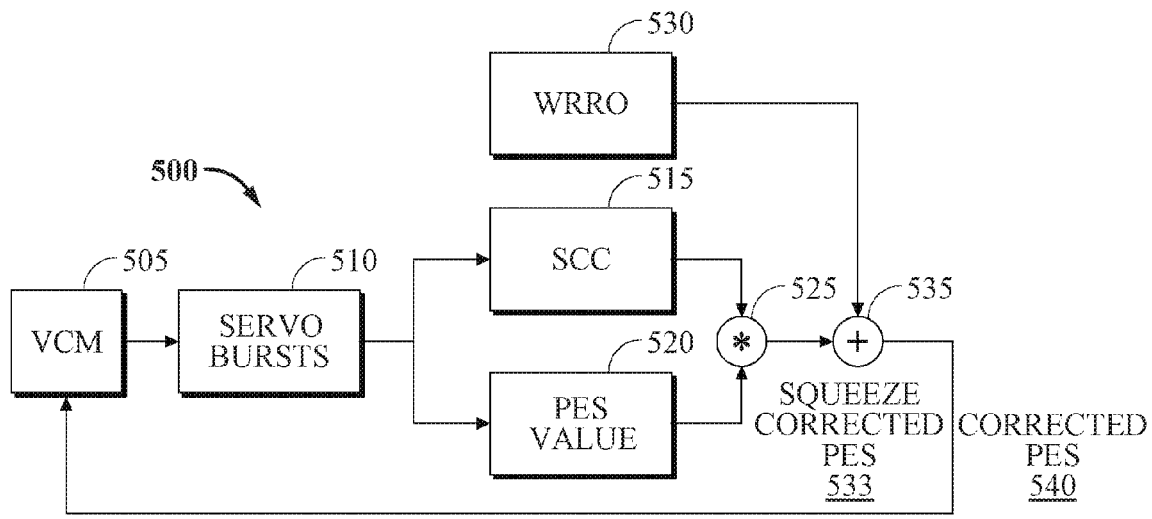
FIG. 5 is a block diagram illustrating a servo control loop that utilizes squeeze corrected PES values, according to one embodiment of the invention.

FIG. 5 is a block diagram showing an illustration of a servo control loop 500 that utilizes squeeze corrected PES values, according to one embodiment of the invention. In particular, based upon a corrected PES value 540, the servo controller implementing servo control loop 500 commands voice coil motor (VCM) 505 to position the head of the disk drive to read servo bursts 510 of a servo sector during track following.

Based upon read servo bursts 510, a SCC value 515 is determined and a PES value 520 is determined. A squeeze corrected PES value 533 is then calculated based upon a combination of the SCC value 515 and PES value 520. In particular, combiner 525 may combine the current and the past SCC values 515 and the current and past PES values 520 to obtain the squeeze corrected PES value 533 according to the Squeeze Corrected PES Value equation above.

Thus, a SCC is calculated that is applied to the current PES value to arrive at a track squeeze corrected PES value 533. The squeeze corrected PES value 533 is then utilized to control VCM 505 such that a servo control system is provided that continually utilizes squeeze corrected PES values for increased servo accuracy, robustness, and stability. Although a linear equation is illustrated above, it can be appreciated that linear or non-linear techniques may be used.

Additionally, an estimation of WRRO 530 may be added to the squeeze corrected PES value 533 in the servo control loop at adder 535 to yield corrected PES 540 even further improving servo control accuracy.

Figure 6:
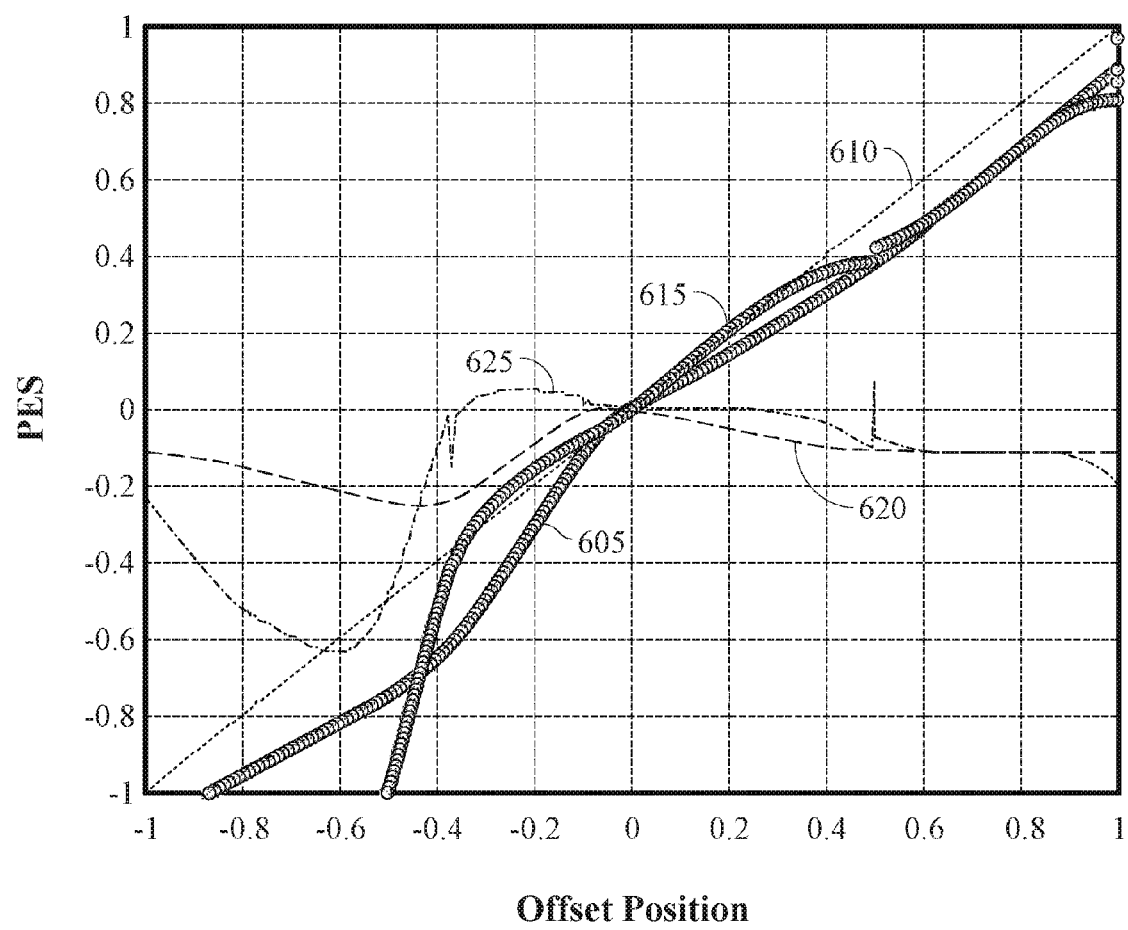
FIG. 6 is a graph that illustrates an example of reduced PES error, according to one embodiment of the invention.

FIG. 6 is a graph that illustrates an example of the reduced PES error that may be achieved by applying the previously-described servo track squeeze compensation techniques, according to one embodiment of the invention. In FIG. 6, the y-axis is representative of PES values and the x-axis is representative of offset position about the track center (0). Line 610 represents ideal linear PES (i.e., a straight linear line) and line 605 represents the actual measured PES before track squeeze compensation. The PES error before track squeeze compensation is illustrated by line 620.

Utilizing the previously-described servo track squeeze compensation techniques, line 615 shows the actual measured PES and line 625 shows the PES error that is achieved when track squeeze compensation is employed. As can be seen by line 625, the PES error achieved when utilizing squeeze compensation is closer to zero for a significantly greater range of offset positions about the track center than the PES error 620 achieved when squeeze compensation is not utilized. Accordingly, utilizing the previously-described servo track squeeze compensation techniques may provide a more accurate servo control loop for track following.

Figure 7:
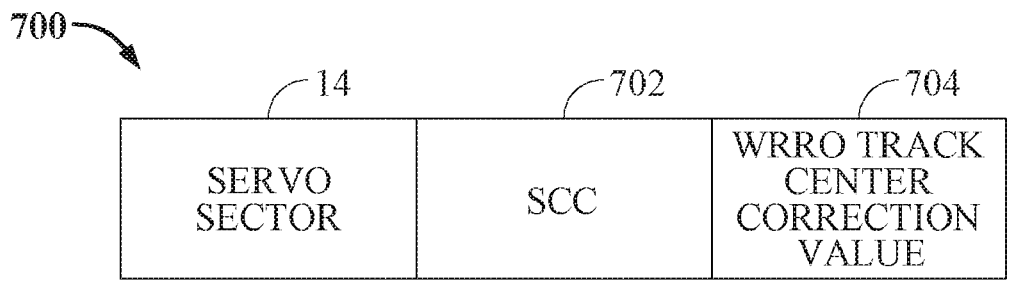
FIG. 7 is a diagram illustrating additional information that may be stored in a servo sector, according to one embodiment of the invention.

FIG. 7 is a diagram illustrating additional information that may be stored in a servo sector 700, according to one embodiment of the invention. For example, in addition to the servo sector information stored in servo sector 14, previously described with reference to FIG. 2, the SCC for a servo sector may also be stored in servo sector 700 in a SCC data field 702. Additionally, in one embodiment, the WRRO track center correction value for the servo sector may also be stored in addition to the SCC in servo sector 700 in a WRRO track center correction value field 704. In this way, the SCC and the WRRO track center correction value for a servo sector can be read from the servo sector and utilized in the previously-described servo track squeeze compensation techniques.

Further, according to one embodiment of the invention, a method for enhancing WRRO correction effectiveness at off-track positions is disclosed. In particular, one or more incremental WRRO correction values with reference to the WRRO track center correction value may be determined and stored in addition to the existing WRRO track center correction value. The off-track WRRO correction values may be measured using existing and well-known WRRO calibration methods using on-track WRRO data as initial values.

Figure 8:
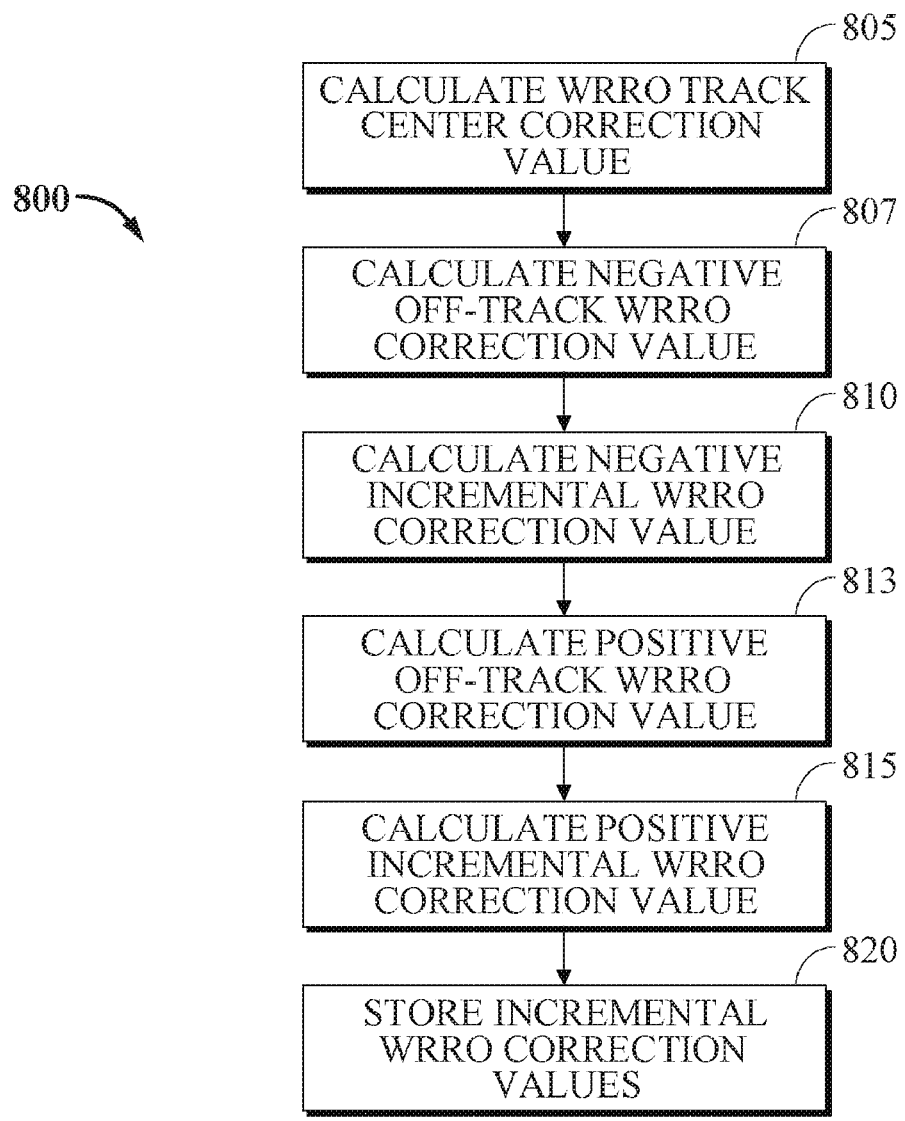
FIG. 8 is a flow diagram illustrating a process to calculate incremental WRRO correction values, according to one embodiment of the invention.

FIG. 8 is a flow diagram illustrating a process 800 to calculate incremental WRRO correction values, according to one embodiment of the invention. At block 805, a WRRO track center correction value is calculated. Next, a negative off-track WRRO correction value is calculated (block 807). The negative off-track WRRO correction value is calculated at a step-length value away from the track center in the negative direction. The step-length value used may be based upon noise and linearity trade-offs. A negative incremental WRRO correction value from the WRRO track center correction value is then calculated (block 810). The negative incremental WRRO correction value is the difference value between the negative off-track WRRO correction value and the WRRO track center correction value. These calculations may then be implemented in the positive direction from the track center. For example, a positive off-track WRRO correction value a step-length value away from track center in the positive direction may be calculated (block 813). A positive incremental WRRO correction value from the WRRO track center correction value may then be calculated (block 815). The positive incremental WRRO correction value is the difference value between the positive off-track WRRO correction value and the WRRO track center correction value. Next, the incremental WRRO correction values may be stored in the servo sector (block 820).

Figure 9A:
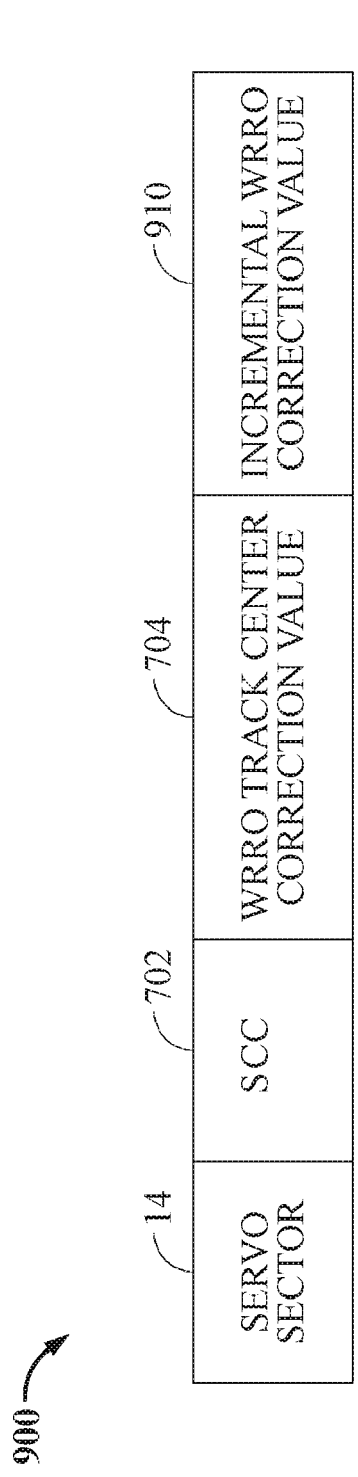
FIG. 9A is a diagram that illustrates a servo sector that includes a WRRO track center correction value field and an incremental WRRO correction value field, according to one embodiment of the invention.

FIG. 9A illustrates a servo sector 900, similar to the servo sector described in FIG. 7, which includes the servo information of servo sector 14, the SCC field 702, the WRRO track center correction value field 704, and further includes an incremental WRRO correction value field 910. One of the negative or positive incremental WRRO correction values or an average of these values may be stored in the incremental WRRO correction value field 910.

Figure 9B:
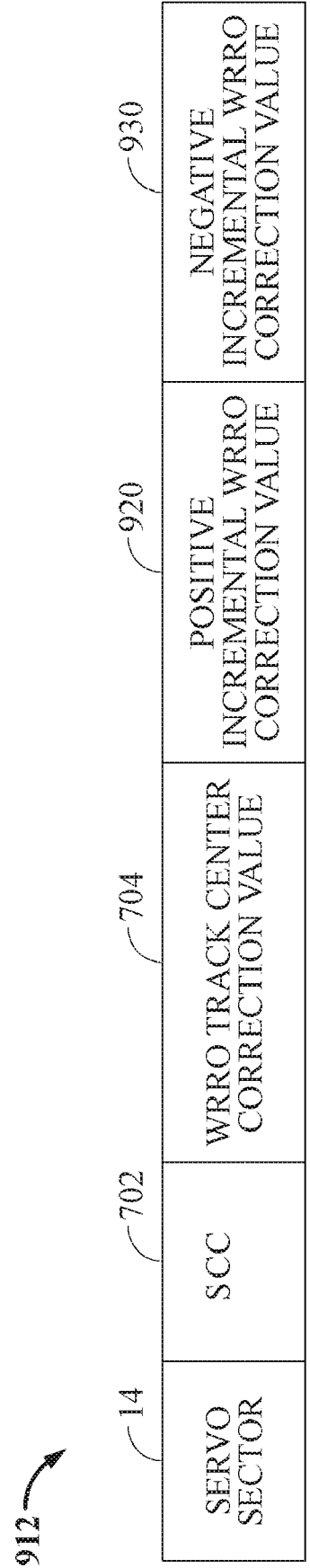
FIG. 9B is a diagram that illustrates a servo sector that includes a WRRO track center correction value field and positive and negative incremental WRRO correction value fields, according to one embodiment of the invention.

Similarly, as shown in FIG. 9B, a servo sector 912 may also include both the positive and negative incremental WRRO correction values. FIG. 9B illustrates the servo information of servo sector 14, the SCC field 702, the WRRO track center correction value field 704, along with data fields 920 and 930 for the positive incremental WRRO correction value and the negative incremental WRRO correction value.

Thus, in one embodiment, an incremental WRRO correction value 910 may be stored in servo sector 900. The incremental WRRO correction value 910 may be used for one or more off-track positions during track following at off-track positions from track center. In another embodiment, a positive incremental WRRO correction value 920 and a negative incremental WRRO correction value 930 may be stored in servo sector 912 for use during track following at one or more off-track positions in a positive or negative direction from track center, respectively.

It should be appreciated that FIGS. 9A and 9B are only illustrative examples. For example, the SCC may or may not be utilized. Further, additional incremental WRRO correction values may be utilized dependent upon design considerations. It should be appreciated that there is a trade-off between format efficiency based upon the total number of incremental WRRO correction values stored versus the improved accuracy in servo control gained by utilizing additional incremental WRRO correction values.

During operation, in one embodiment, the servo controller receives the WRRO track center correction value 704 and the off-track incremental correction values 910 or 920 and 930 and based upon these values calculates WRRO correction values for off-track locations. Further, based upon the WRRO correction value 704 and the incremental WRRO correction values, linear or non-linear interpolation/extrapolation may be employed to find the most accurate WRRO correction value. By utilizing stored incremental WRRO correction values, in addition to a stored SCC, seeking and settle performance, and track following accuracy at on-track locations and off-track locations may be significantly improved.

It should be appreciated that the previously-described processes and techniques may be implemented by a program or routine implemented by the processor or other circuitry of the disk drive. It should further be appreciated that components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements. The program or code segments may be stored in a processor readable medium. Further, the "processor readable or accessible medium" may include any medium that can store, transmit, or transfer information. Examples of accessible medium include an electronic circuit, a semiconductor memory device, a read only memory (ROM), a flash memory, an erasable ROM (EROM), a floppy diskette, a compact disk (CD-ROM), an optical disk, a hard disk, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes previously described can be employed for disk drives with embedded servo systems. However, numerous alternatives for disk drives with similar or other media format characteristics can be employed by those skilled in the art to use the invention with equal advantage to implement these techniques. Further, although embodiments have been described in the context of a disk drive with embedded servo sectors, the invention can be employed in many different types of disk drives having a head that scans the media.

What is claimed is:

1. A disk drive that compensates for servo track squeeze, the disk drive comprising:
    a disk having tracks, the tracks including a servo sector having servo bursts spaced sequentially around a circumference of the track for use in track following;
    a head to track-follow on the track, wherein track following includes the head reading the servo bursts; and
    a processor to compensate for track squeeze by implementing operations including:
        determining a track squeeze value for the servo sector based upon reading the servo bursts;
        determining a position error signal (PES) value for the servo sector based upon the read servo bursts;
        estimating a Squeeze Correction Coefficient (SCC) to account for PES sensing gain variation associated with the servo sector;
        calculating a squeeze corrected PES value based upon the SCC and the PES value, wherein the squeeze corrected PES value is calculated by an equation: Squeeze Corrected PES Value=$SCC(z)*PES\ value(z)$, wherein z=position and $SCC(z)=(|N|+|Q|)/(|N|_{nominal}+|Q|_{nominal})$, where N and Q are burst measurements at position z; and
        utilizing the squeeze corrected PES value in servo control.

2. The disk drive of claim 1, wherein the track squeeze value is calculated based upon a track squeeze model having calibrated parameters for a servo sector.

3. The disk drive of claim 1, wherein the SCC is based on the PES value and the track squeeze value.

4. The disk drive of claim 1, wherein $N=|A-B|$ and $Q=|C-D|$ from a 4-burst pattern.

5. The disk drive of claim 1, wherein the SCC for the servo sector is stored in the servo sector.

6. The disk drive of claim 5, wherein a written-in repeatable run-out (WRRO) track center correction value is stored in the servo sector.

7. The disk drive of claim 6, wherein an incremental WRRO correction value for one or more off-track positions is stored in the servo sector for use during track following at off-track positions from track center.

8. The disk drive of claim 6, wherein a positive incremental WRRO correction value and a negative incremental WRRO correction value are stored in the servo sector for use during track following at one or more off-track positions in a positive or negative direction from track center, respectively.

9. A method to compensate for servo track squeeze in a disk drive, the method comprising:
    reading servo bursts of a servo sector of a disk during track following;
    determining a track squeeze value for the servo sector based upon the read servo bursts;
    determining a position error signal (PES) value for the servo sector based upon the read servo bursts;
    estimating a Squeeze Correction Coefficient (SCC) to account for track squeeze induced PES sensing gain variation associated with the servo sector;
    calculating a squeeze corrected PES value based upon the SCC and the PES value, wherein the squeeze corrected PES value is calculated by an equation: Squeeze Corrected PES Value=$SCC(z)*PES\ value(z)$, wherein z=position and $SCC(z)=(|N|+|Q|)/(|N|_{nominal}+|Q|_{nominal})$, where N and Q are burst measurements at position z; and
    utilizing the squeeze corrected PES value in servo control to compensate for track squeeze.

10. The method of claim 9, further comprising calculating the track squeeze value based upon a track squeeze model having calibrated parameters for a servo sector.

11. The method of claim 9, further comprising estimating the SCC based upon the PES value and the track squeeze value.

12. The method of claim 11, further comprising storing the SCC for the servo sector in the servo sector.

13. The method of claim 12, further comprising storing a written-in repeatable run-out (WRRO) track center correction value in the servo sector.

14. The method of claim 13, further comprising storing an incremental WRRO correction value for one or more off-track positions in the servo sector for use during track following at off-track positions from track center.

15. The method of claim 13, further comprising storing a positive incremental WRRO correction value and a negative incremental WRRO correction value in the servo sector for use during track following at one or more off-track positions in a positive or negative direction from track center, respectively.

16. The method of claim 9, wherein $N=|A-B|$ and $Q=|C-D|$ from a 4-burst pattern.

* * * * *